US 6,739,330 B1

(12) United States Patent
Ross

(10) Patent No.: US 6,739,330 B1
(45) Date of Patent: May 25, 2004

(54) FOAM COOK TOP RANGE STAND CONSTRUCTION SYSTEM

(76) Inventor: Stephen Ross, 18712 Rancho Circle La., Yorba Linda, CA (US) 92807

( * ) Notice: Subject to any disclaimer, the term of this patent is extended or adjusted under 35 U.S.C. 154(b) by 135 days.

(21) Appl. No.: 10/228,325

(22) Filed: Aug. 27, 2002

(51) Int. Cl.$^7$ ................................................ A47J 37/00
(52) U.S. Cl. ..................... 126/41 R; 126/37 R; 126/40; 126/50; 52/309.4
(58) Field of Search ............................. 126/25 R, 41 R, 126/40, 50, 305, 304 R, 37 R; 312/236, 237; 108/27, 901, 150; 52/746.1, 309.7, 309.4; 248/127

(56) References Cited

U.S. PATENT DOCUMENTS

| 4,236,460 A | * | 12/1980 | Poupko ........................ 108/41 |
| 4,407,104 A | | 10/1983 | Francis ........................ 52/309 |
| 4,586,301 A | | 5/1986 | Hickman ....................... 52/96 |
| 4,875,322 A | | 10/1989 | Rozzi ........................... 52/746 |
| 5,009,051 A | | 4/1991 | Trezza ......................... 52/410 |
| 5,072,569 A | | 12/1991 | VanTassel ..................... 52/745 |
| 5,178,327 A | | 1/1993 | Palamand et al. ............. 428/71 |
| 5,199,415 A | | 4/1993 | Johnson, Jr. ................. 126/500 |
| 5,511,346 A | | 4/1996 | Kenworthy ................... 52/169.5 |
| 5,619,827 A | | 4/1997 | Church ......................... 52/60 |
| 5,661,929 A | | 9/1997 | Ross |
| 5,893,248 A | | 4/1999 | Beliveau ...................... 52/309.7 |
| 6,067,765 A | | 5/2000 | Jones ........................... 52/309.12 |
| 6,085,479 A | | 7/2000 | Carver ......................... 52/309.8 |
| 6,315,026 B1 | | 11/2001 | Ross |
| 6,354,288 B1 | | 3/2002 | McDonald .................... 126/519 |
| 2003/0094170 A1 | * | 5/2003 | Harrod et al. ............... 126/41 R |
| 2004/0017135 A1 | * | 1/2004 | Roberts et al. .............. 312/140.3 |

* cited by examiner

*Primary Examiner*—James C. Yeung
(74) *Attorney, Agent, or Firm*—Goldstein Law Offices, P.C.

(57) ABSTRACT

A barbeque stand for supporting a cook top, having a base made substantially of foam, having a base top, a base bottom, and a cutout extending downward from the base top and having cutout sides and a cutout bottom. Fireproof boards extend against the base top, the cutout sides and the cutout bottom. Slots extend longitudinally parallel and adjacent to the base top, the cutout sides, and the cutout bottom. Inserts extend through the slots and are sized to fit snugly therein. The fireproof boards are anchored to the foam base by securing the fireproof boards to the inserts.

10 Claims, 5 Drawing Sheets

FOAM COOK TOP RANGE STAND CONSTRUCTION SYSTEM

BACKGROUND OF THE INVENTION

The invention relates to a foam cook top range stand construction system. More particularly, the invention relates to a system which allows a stand to be constructed using a foam base, for supporting a cook top range and allowing the range to be safely used.

In many modern homes, the kitchen is designed to include an "island" to relieve some of the duties of the cabinets and countertop located along the perimeter of the kitchen. In particular, at times this island is used purely for additional counter space. However, a recent trend has been to incorporate some of the kitchen appliances into the island to redirect some of the food preparation, cooking, and clean-up activities away from the perimeter counter space. A popular choice is to include a cook top range in the island countertop.

Due to the popularity of a "cooking island" interior kitchen designs, similar concepts have been carried into outdoor spaces. Many homeowners desire the same conveniences when cooking outdoors as they have in their interior kitchens. A common complaint among outdoor chefs is that standard barbeques do not provide adequate provisions for holding food to be cooked, food that has just been cooked, cooking implements, and do not provide a workspace for performing other food-prep tasks. Accordingly, more and more outdoor "barbeque islands" are being constructed.

A barbeque island is constructed to have similar usefulness as an interior cooking island. In particular, it has a large working surface that is generally at "standard counter height", and has a barbeque cook top partially sunken below the countertop. The barbeque island thereby provides the outdoor chef the convenience of being surrounded by countertop space while cooking.

The most robust way to construct an outdoor barbeque island, so that it is best equipped to handle the elements, is to build it using masonry materials. Brick and stone islands, pieced together by hand and mortar are clearly 'built to last'. However, the construction of such islands is labor intensive and involves significant expense. In addition, the construction materials themselves often dictate the design and limit the choices in configuring the island. Further their significant weight requires an adequate support surface and makes them immovable permanent fixtures. Accordingly masonry based barbeque islands are unsuitable for many outdoor installations.

Interior island construction methods are often employed when building outdoor barbeque islands as a less expensive, more practical, and less permanent installation. Typically the island is framed with wood, sheeted, and finished as desired. Although care is generally given to make such islands as weatherproof as possible, inevitably water infiltrates the island and rots the framing. In addition, such islands are typically built and finished on location. Accordingly, such islands are still not inexpensive to construct.

While these units may be suitable for the particular purpose employed, or for general use, they would not be as suitable for the purposes of the present invention as disclosed hereafter.

Accordingly, it would be highly desirable to allow an outdoor barbeque island to be inexpensively constructed of lightweight materials, having significant longevity. In this regard, polystyrene foam is lightweight, durable, and inexpensive, has significant durability and resistance to the elements, and can be formed in infinite shapes and sizes. However, foam is very susceptible to heat. Accordingly, its use in close proximity with a barbeque would not typically be considered feasible.

My prior U.S. Pat. No. 5,661,929 discloses a parapet molding flashing installation system which allows a flashing cap to be anchored to a foam parapet molding using anchor inserts which extend within the foam and are attached to the flashing cap. The principles of this patent have formed a basis for the present invention. Accordingly, this patent and is hereby incorporated by reference.

In addition, my prior U.S. Pat. No. 6,315,026 discloses a system for attaching a foam cornice ornament atop a window. The cornice is attached to the window structure using conventional brackets and principles which formed a basis for the development of the present invention.

SUMMARY OF THE INVENTION

It is an object of the invention to provide a barbeque stand that is lightweight, durable, and inexpensive to manufacture. Accordingly, the barbeque stand has a base made of polystyrene foam and a cook top receptacle lined with fireproof board.

It is another object of the invention that the foam and fireproof board may be securely and permanently attached together. Accordingly, the foam has a plurality of slots, extending parallel to the foam surface where fireboard is to be attached. An insert extends into each slot and facilitates the attachment of the fireboard to the foam by securing the fireboard to the insert.

It is a further object of the invention to provide a significant countertop space adjacent to the cook top. Accordingly use of foam allows a large base to be fabricated that provides significant countertop space at minimal expense.

It is still a further object of the invention that the countertop is heat resistant. Accordingly, fireproof board is secured to the foam base to isolate the countertop from the base. The fireproof board is secured to the foam using inserts locating in slots parallel and adjacent to the countertop.

It is yet a further object of the invention to that the base may be shaped in any desired configuration. Accordingly, the base may be configured in virtually any shape, employing the concepts of the present invention.

It is a yet another object of the invention to provide a barbeque island that may be finished in a variety of ways. Accordingly, the countertop surfaces may be easily covered within tiles. In addition, the vertical surfaces of the foam base are easily covered with tiles, stucco, and a variety of other specialized coatings and finishes.

The invention is a barbeque stand for supporting a cook top, having a base made substantially of foam, having a base top, a base bottom, and a cutout extending downward from the base top and having cutout sides and a cutout bottom. Fireproof boards extend against the base top, the cutout sides and the cutout bottom. Slots extend longitudinally parallel and adjacent to the base top, the cutout sides, and the cutout bottom. Inserts extend through the slots and are sized to fit snugly therein. The fireproof boards are anchored to the foam base by securing the fireproof boards to the inserts.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
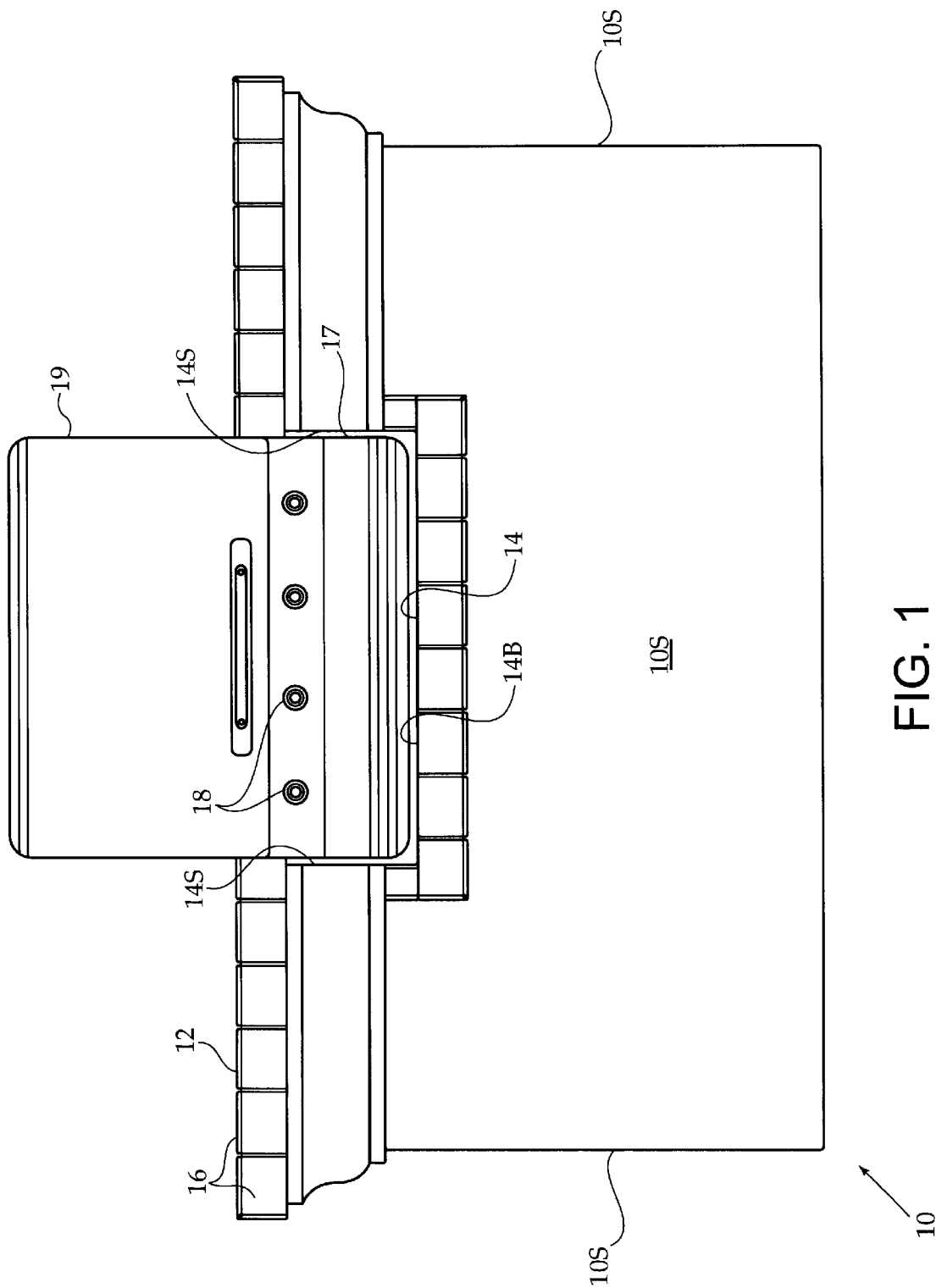
FIG. 1 is a front elevational view of a barbeque stand according to the present invention with a cook top range and associated hood installed therein.

FIG. 1 illustrates a barbeque stand 10 having a front 10F, sides 10S, and a countertop surface 12. The stand 10 further has a cook top cutout 14, which is "notched" into the stand 10, such that the cutout 14 extends downward from the countertop surface 12 and inward from the front 10F. The cutout 14 includes a cutout bottom 14B and cutout sides 14S. As illustrated, the countertop surface 12 is covered with tiles 16. The tiles 16 are also secured adjacent to the cutout bottom 14B and on vertical surfaces adjacent to the countertop surface 12. However, as the tiles 16 are employed as a finishing element for the present invention, various other finishing materials may be employed in a similar manner.

As shown in FIG. 1, a cook top 17 having front panel controls 18 and a hood 19 is mounted within the cutout 14. The cook top 17 has burners that are located immediately above the front panel controls 18. Accordingly, the cook top 17 is recessed below the countertop surface 12 such that the burners are substantially at the same height as the countertop surface 12. The cook top 17 illustrated is covered by a hood 19. However, various configurations of cook tops 17 may be employed with the present invention.

Figure 2:
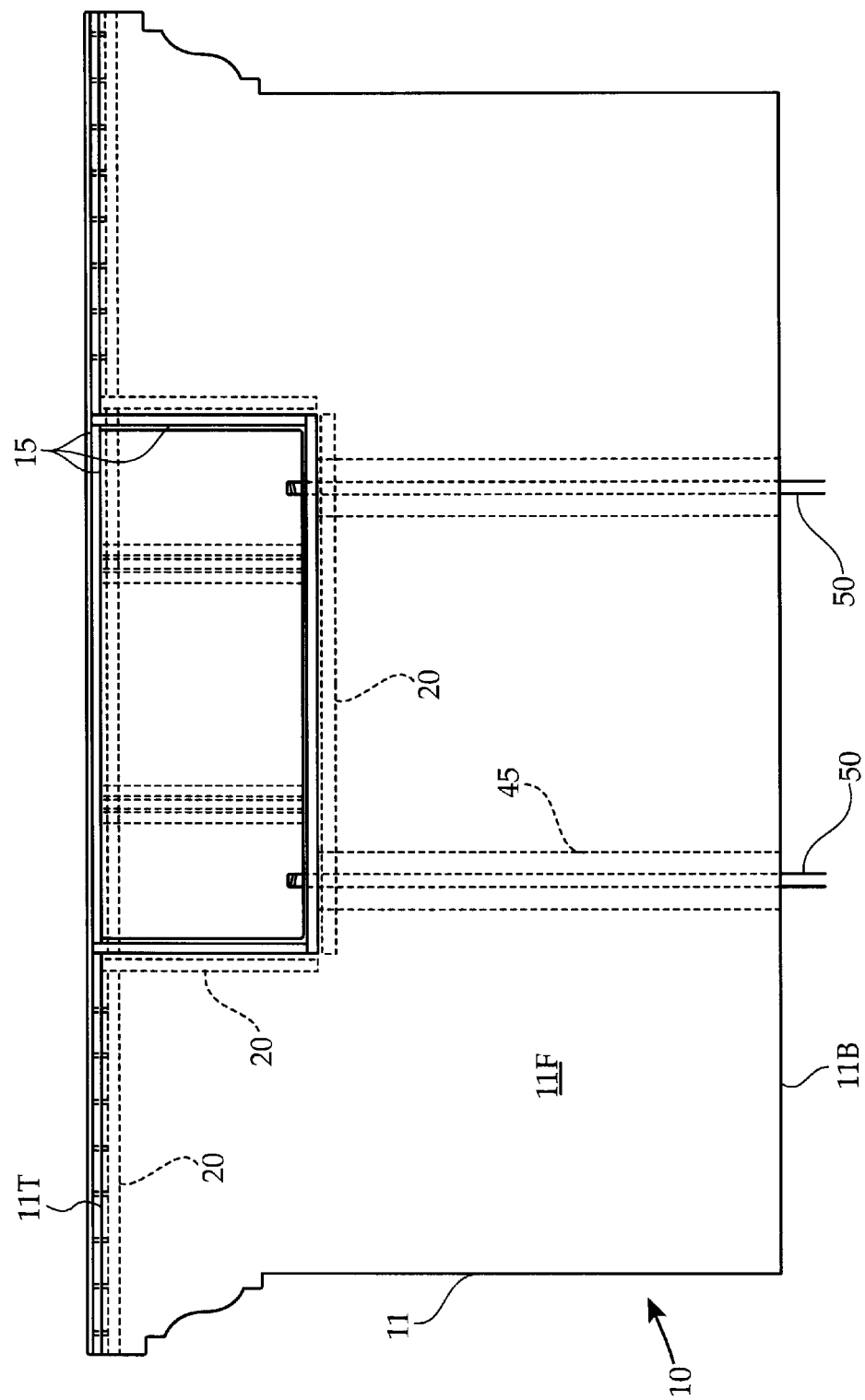
FIG. 2 is a diagrammatic front elevational view of the barbeque stand, per se, wherein the slots extending within the foam, inserts extending therein, and plumbing ducts are indicated in hidden lines.

Referring now to FIG. 2, the cook top has been removed, as well as fascia from the front surface 10F to reveal construction of the barbeque stand 10. In particular, the barbeque stand 10 includes a base 11 and fireproof board 15. The base is made of foam, which is cast, cut, and otherwise formed into any desired shape. Preferably the foam is a rigid closed cell expanded foam, and most preferably is expanded polystyrene foam.

The base has a base top 11T and a base bottom 11B. A pair of plumbing ducts 45 extend vertically through the base 10 between the base bottom 10B and the cutout bottom 14B to allow conduits 50 to extend vertically therethrough, to supply natural gas, propane, other fuel, or power to the cook top 17. The fireproof board 15 extends across and against surfaces that are to come into contact with the cook top or heated cooking implements. Accordingly, the fireproof board 15 extends across the base top 11T and the cutout bottom 14B, and against the cutout sides 14S. The fireproof board 15 thereby protects the foam from heat damage. The fireproof board 15 is preferably a composite board of a type similar to the fireproof board sold under the trademark WONDERBOARD. The fireproof board is attached to the surfaces of the base 10 in a manner that will be described in detail hereinafter. The base may be constructed as a single block of foam, or may be fabricated in multiple pieces that are subsequently adhered together.

Figure 3:
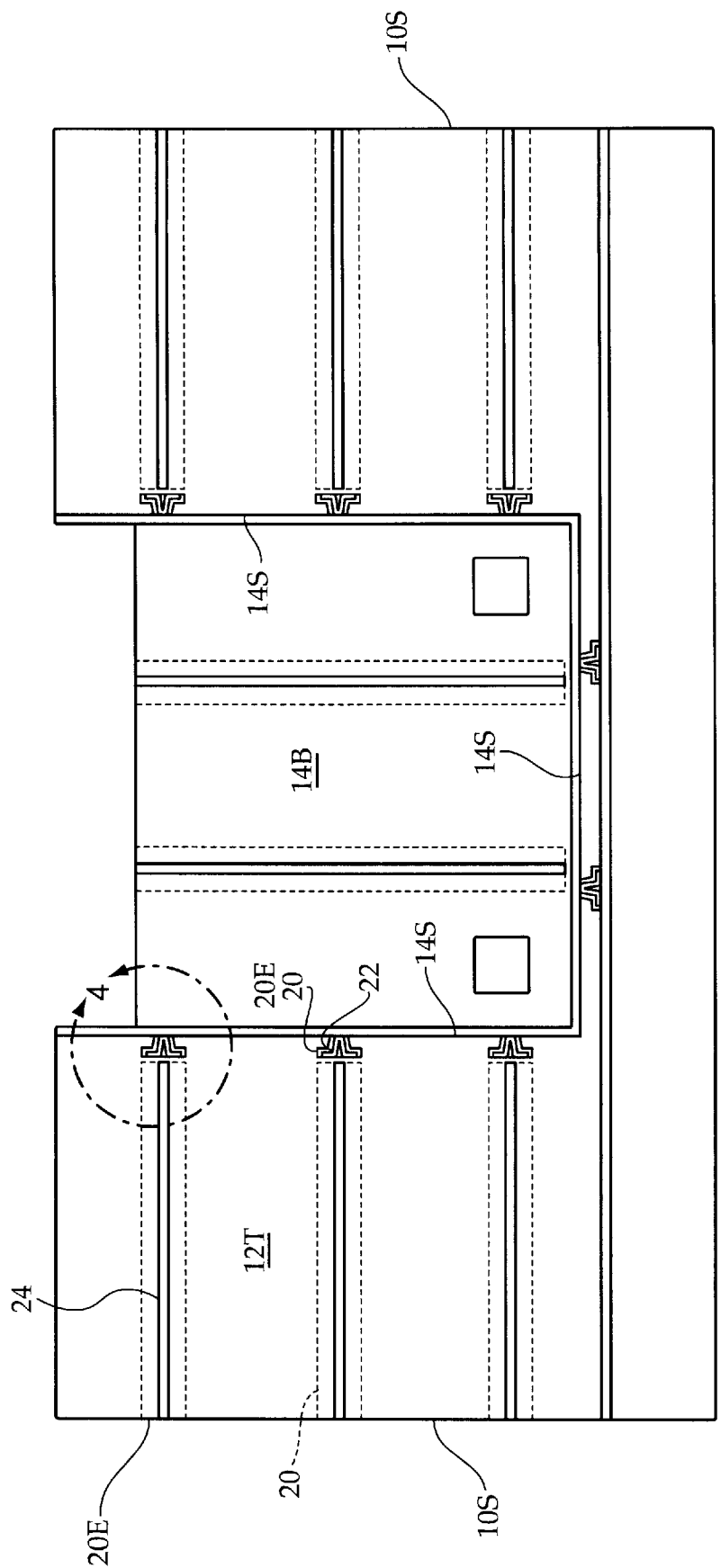
FIG. 3 is a top plan view, with the top board removed, as well as fireboard normally covering the cutout base, illustrating the slots and inserts extending horizontally and vertically in the foam base.
Figure 4:
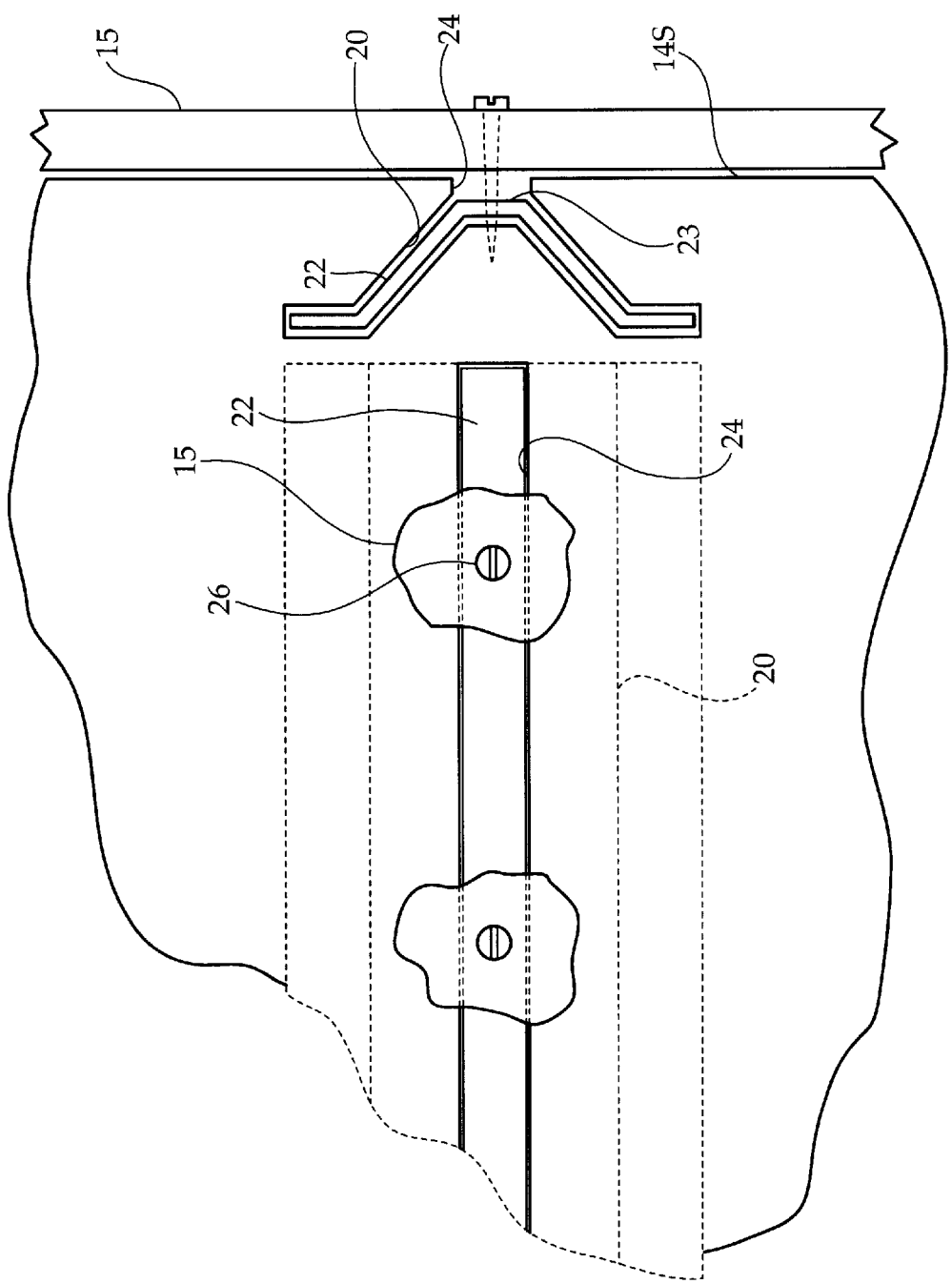
FIG. 4 is an enlarged top elevational view, taken generally in the area of circle 4 in FIG. 3, except wherein the top fireproof board is mostly broken away, except immediately around the screws, to detail the slots and the inserts extending therein, as well as attachment of the fireproof board to the inserts.
Figure 5:
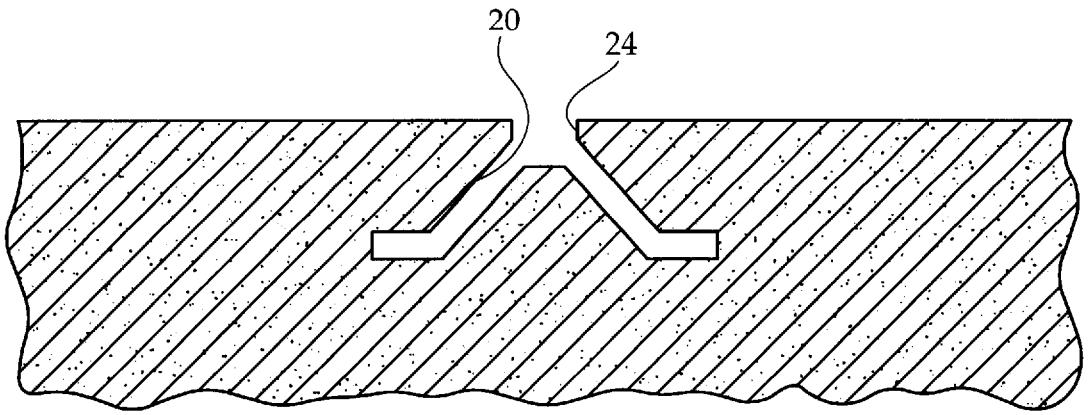
FIG. 5 is a cross sectional view of the foam, illustrating one of the slots having a "Dutch hat" cross sectional configuration.

As illustrated in FIG. 2, 3, and 4, a plurality of slots 20 extend parallel and adjacent to each surface where the fireproof board 14 is to be attached to the base 12. An insert 22 extends within each slot 20. Accordingly, in order to introduce the insert 22 into the slots 20, each slot 20 must have at least one open end 20E to position or otherwise slide the insert 22 into the slot 20. However, such open end 20E may be covered or blocked by other portions of the base 10 once the insert 22 is fully positioned within its slot. Thus, if the slots 20 extending along the cutout bottom 14B were oriented longitudinally instead of transversely as shown in FIG. 3, the portion of the base 10 beneath the cutout bottom 14B could be partially fabricated separately from a "U-shaped" remainder of the base, wherein the slots would be formed and the insert 22 positioned in said slots before that portion of the base would be adhered to the U-shaped remainder of the base 10.

However, where practical, the slots 20 have two open ends 20E, such that the insert 22 extends fully between both open ends 20E. Configuring the base in such a manner allows the slots to be cut into the base using a preferred manufacturing technique by which a heated wire is used to form the slots. The slots 20 each have a longitudinal upper opening 24 extending substantially its full length. The upper opening 24 also facilitates the use of the wire in cutting the slots. Further, for clarity the slots are illustrated in FIG. 3 as not extending fully from the stand sides 10S to the cutout sides 14S, so as to better visualize the vertically and horizontally extending slots. However, they could easily be staggered in the transverse direction so that they do not interfere with each other.

Also seen in FIG. 3, the slots 20 extend horizontally immediately beneath the base top 10T, wherein the slot 20 is exposed at said base top 12T through the upper opening 24. Further, as illustrated, the slots extend vertically immediately adjacent to and parallel to the cutout sides 14S, and have upper openings 24 through the cutout sides 14S. Still further, the slots extend horizontally immediately below the cutout bottom 14B, wherein each of said slots 20 is exposed through upper openings 24 at the cutout bottom 14B. The inserts 22 extending through the slots 20 are exposed at the upper openings 24. The inserts 22 each have a mating surface 23 that extends substantially parallel to the surface having the opening 24 and substantially spans said opening 24.

Note that as used herein, the "upper openings" need not be strictly oriented upward. In general they are openings at the surface where the slots are exposed that extend close to that surface and immediately "beneath". In the same regard then, "beneath", refers to away from the surface as opposed to strictly vertically downward. In particular, the upper openings 24 are equivalently descriptive of the slots 20 extending vertically adjacent to the cutout sides 14S.

FIG. 4, FIG. 5, FIG. 6, and FIG. 7, illustrate how the slots 20 and inserts 22 cooperate to allow the fireproof board 14 to be attached to the foam base 10. In particular, the slots 20 are cut into the foam and are sized to closely accommodate the inserts 22 so that the inserts fit snugly within the slots 20. The upper opening 24 of each slot 20 exposes the mating surface 23 of the insert 22 extending therein. The inserts 22 have a flanged portion 25 which extends laterally from the mating surface 23, transverse to the slot, anchors the insert 22 within the slot, and prevents the insert 22 from being removed through the opening 24. In general, the flanged portion 25 is configured so as to allow a significant normal force to be exerted against the mating surface.

Figure 6:
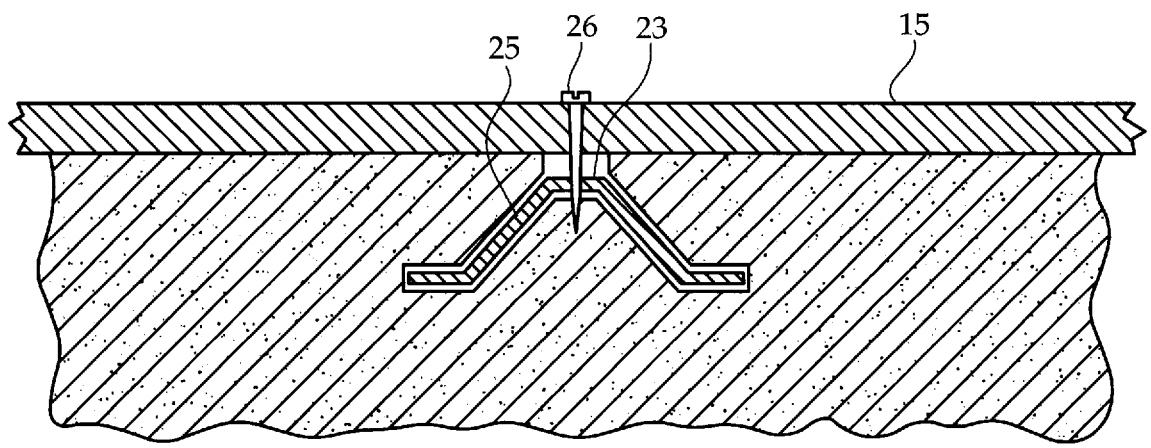
FIG. 6 is a cross sectional view, similar to FIG. 5, wherein the insert is extending within the slot, and one of the fireproof boards is anchored thereto.
Figure 7:
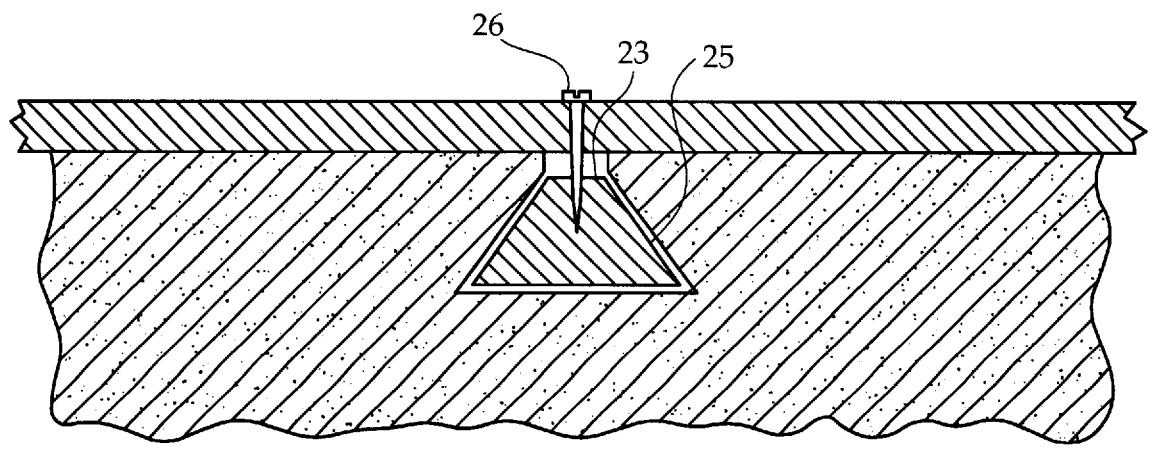
FIG. 7 is a cross sectional view, similar to FIG. 6, except where the slot is shaped to accommodate a trapezoidal insert, as shown.

Thus as illustrated, once the insert 22 is within the slot, the fireproof board 15 is attached directly to the mating surface 23 of the insert 22. In particular, fastening devices, such as screws 26 are inserted through the fireproof board 15 and into the mating surface 23 of the insert 22, as shown in FIG. 4, FIG. 6, and FIG. 7. Generally numerous screws 26 are evenly spaced longitudinally along each slot 22, distributing any separating force of the board along the slot 22 and along the insert 22. This scheme of attachment makes it possible to employ a base made of foam, and attach fireproof board to the foam to make it suitable for use in proximity to the high temperatures generated by a barbeque.

Accordingly, the fireproof board 15 is used to line the surfaces that will contact the barbeque or cook top, or might otherwise come into contact with heated objects such as cooking implements. As best seen in FIG. 2 and FIG. 3, a sheet of fireboard, which is notched to match the cutout 14, and which helps form the countertop 12, covers the base top 11T. Similarly, the cutout bottom 14B is covered with the fireboard, as are the cutout sides 14S.

With the base 11 properly protected by the fireboard, the barbeque stand 10 may be covered with a finish layer as desired. As shown in FIG. 1, the base 11 is partially covered by tiles 16. The tiles are used to create the countertop 12 on the fireboard 15 covering the base top 11T, to cover the fireboard 15 within the cutout 14, and to partially finish the stand sides 10S. However, numerous other finishing techniques, schemes, and materials can be employed. For example, the fireproof board as well as the stand sides 10S can be finished with stucco or other coatings and finishes.

In conclusion, herein is presented a barbeque stand which is constructed to have a foam base covered by fireproof board, where the attachment of the fireproof board to the foam is facilitated by the use of slots within the foam and inserts positioned within the slots such that the board is anchored to the inserts. The invention may be embodied in the form illustrated in the accompanying drawings and described in the foregoing description. However, such is illustrative only. Numerous variations are possible while adhering to the inventive concept. Such variations are contemplated as being part of the present invention.

What is claimed is:

1. A barbeque stand for supporting a cook top, the cook top having burners, comprising:
   a base, the base substantially made of foam, the base having a base top, a base bottom, and a cutout extending into the base top, the cutout sized for accommodating the cook top, the cutout having cutout sides and a cutout bottom;
   fireproof boards, extending substantially across the base top forming a countertop, and extending against the cutout sides and upon the cutout bottom; and
   an attachment system for attaching the fireproof boards to the foam.

2. The barbeque stand as recited in claim 1, wherein the base has a plurality of slots extending within the base, the slots extending parallel and adjacent to each surface against which the fireproof boards extend, wherein the attachment system further comprises inserts extending within the slots and fasteners for attaching the boards to the inserts.

3. The barbeque stand as recited in claim 2, wherein the slots each have a longitudinally extending upper opening through the surface they are adjacent and parallel to;
   wherein the inserts each have a mating surface which substantially transversely spans the upper opening; and
   wherein each board is attached to each insert by the fasteners extending through said board, through one of the upper openings and into the mating surface of said insert.

4. The barbeque stand as recited in claim 3, wherein each slot has at least one end opening for allowing the insert to be positioned therein.

5. The barbeque stand as recited in claim 4, wherein the base has at least one plumbing duct extending vertically from the base bottom to the cutout bottom.

6. The barbeque stand as recited in claim 5, wherein each insert has a flanged portion that extends laterally from the mating surface, anchors the insert within the slot, and prevents the insert from being removed through the opening.

7. A barbeque stand construction method, for supporting a cook top having burners, comprising:
   forming a base substantially of foam, having a base top, a base bottom, a cutout extending downward from the base top and having cutout sides and a cutout bottom;
   cutting slots within the base that extend substantially parallel and adjacent to the base top, the cutout bottom, and the cutout sides;
   positioning inserts within the slots such that the inserts extend longitudinally through the slots substantially the length of each associated slot;
   placing fireproof boards against the base top, the cutout bottom, and the cutout sides; and
   anchoring the fireproof boards to the base by securing fasteners through the fireproof boards and into the inserts.

8. The barbecue stand construction method as recited in claim 7, wherein the step of cutting slots within the base further comprises creating an upper opening extending through the surface of the base said slot extends parallel and adjacent to, the upper opening extending longitudinally along said slot and substantially the length of said slot.

9. The barbeque stand construction method as recited in claim 8, further comprising the step of positioning the cook top within the cutout upon and against the fireproof boards therein.

10. The barbeque stand construction method as recited in claim 9, wherein each insert has a mating surface and is sized to fit closely within the slot, and wherein the step of anchoring the fireproof boards to the base further comprises securing the fasteners through the fireproof boards, through the upper openings, and into the mating surface of the inserts.

* * * * *